(12) United States Patent
Lee et al.

(10) Patent No.: US 8,768,999 B2
(45) Date of Patent: Jul. 1, 2014

(54) SYSTEM AND METHOD OF ACQUIRING CONTENTS

(75) Inventors: Jin Wook Lee, Yongin-si (KR); Hun Lim, Yongin-si (KR); Gene Moo Lee, Seongnam-si (KR); Won Keun Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 12/032,710

(22) Filed: Feb. 18, 2008

(65) Prior Publication Data
US 2009/0094319 A1   Apr. 9, 2009

(30) Foreign Application Priority Data
Oct. 8, 2007 (KR) .................. 10-2007-0101062

(51) Int. Cl.
| | |
|---|---|
| G06F 15/16 | (2006.01) |
| G06F 17/30 | (2006.01) |
| G06K 9/00 | (2006.01) |
| H04N 21/278 | (2011.01) |
| H04N 21/414 | (2011.01) |
| H04N 21/422 | (2011.01) |
| H04N 21/4363 | (2011.01) |
| H04N 21/658 | (2011.01) |

(52) U.S. Cl.
CPC *G06F 17/30* (2013.01); *G06K 9/00* (2013.01); *H04N 21/278* (2013.01); *H04N 21/41407* (2013.01); *H04N 21/42203* (2013.01); *H04N 21/43637* (2013.01); *H04N 21/6581* (2013.01); *G06F 17/30047* (2013.01)
USPC .......................................................... 709/203

(58) Field of Classification Search
USPC ............................................................ 709/203
See application file for complete search history.

(56) References Cited

U.S. PATENT DOCUMENTS

| | | | | |
|---|---|---|---|---|
| 6,563,514 B1 * | 5/2003 | Samar | | 715/711 |
| 6,786,873 B2 * | 9/2004 | Zoth et al. | | 600/559 |
| 6,941,275 B1 * | 9/2005 | Swierczek | | 705/26.61 |
| 6,965,770 B2 * | 11/2005 | Walsh et al. | | 455/426.1 |
| 7,177,867 B2 * | 2/2007 | Stringer-Calvert et al. | | 1/1 |
| 7,327,385 B2 * | 2/2008 | Yamaguchi | | 348/207.1 |

(Continued)

FOREIGN PATENT DOCUMENTS

| | | |
|---|---|---|
| JP | 2002-055994 A | 2/2002 |
| KR | 10-2005-0034660 | 4/2005 |

(Continued)

OTHER PUBLICATIONS

Bober et al., A MPEG-4/7 based Internet Video and Still Image Browsing System, Mitsubishi, pp. 1-7.*

(Continued)

*Primary Examiner* — Andrew Goldberg
(74) *Attorney, Agent, or Firm* — NSIP Law (57) ABSTRACT

A method of acquiring contents between a client terminal and a local server, the method including the client terminal photographing or recording partial information of predetermined contents according to an input of a user, the client terminal transmitting the partial information of contents to a predetermined local server, the local server analyzing the partial information of contents and retrieving contents or content-related information corresponding to the partial information of contents, and the local server transmitting the retrieved contents or content-related information to the client terminal.

14 Claims, 6 Drawing Sheets

(56) References Cited

U.S. PATENT DOCUMENTS

| | | | |
|---|---|---|---|
| 7,853,664 B1* | 12/2010 | Wang et al. | 709/217 |
| 7,870,088 B1* | 1/2011 | Chen et al. | 1/1 |
| 2001/0027396 A1* | 10/2001 | Sato | 704/260 |
| 2002/0198789 A1* | 12/2002 | Waldman | 705/26 |
| 2004/0012810 A1* | 1/2004 | Haas et al. | 358/1.15 |
| 2004/0030755 A1* | 2/2004 | Koning et al. | 709/217 |
| 2004/0061773 A1* | 4/2004 | Liu | 348/14.02 |
| 2004/0158860 A1* | 8/2004 | Crow | 725/46 |
| 2005/0215239 A1* | 9/2005 | Kopra et al. | 455/414.1 |
| 2005/0227674 A1* | 10/2005 | Kopra et al. | 455/414.1 |
| 2006/0268895 A1* | 11/2006 | Kotzin | 370/395.64 |
| 2007/0118375 A1 | 5/2007 | Kenyon et al. | |
| 2007/0164846 A1* | 7/2007 | Pedolsky | 340/5.2 |
| 2007/0192382 A1* | 8/2007 | Harris | 707/201 |
| 2008/0231760 A1* | 9/2008 | Kibble | 348/734 |
| 2009/0037006 A1* | 2/2009 | Hiratsuka et al. | 700/94 |

FOREIGN PATENT DOCUMENTS

| | | |
|---|---|---|
| KR | 10-2006-0074514 | 7/2006 |
| KR | 10-2006-0080995 | 7/2006 |
| KR | 10-2006-0121620 A | 11/2006 |
| KR | 10-2007-0017162 A | 2/2007 |
| WO | WO 2004/046965 A2 | 6/2004 |
| WO | WO 2004/088538 A2 | 10/2004 |
| WO | WO 2005/093623 A1 | 10/2005 |

OTHER PUBLICATIONS

Korean Office Action issued on Jan. 11, 2013 in counterpart Korean Patent Application No. 10-2007-0101062 (6 pages in Korean).

* cited by examiner

SYSTEM AND METHOD OF ACQUIRING CONTENTS

CROSS-REFERENCE TO RELATED APPLICATION

This application claims the benefit under 35 USC 119(a) of Korean Patent Application No. 10-2007-0101062 filed on Oct. 8, 2007, in the Korean Intellectual Property Office, the entire disclosure of which is incorporated herein by reference.

TECHNICAL FIELD

The following description relates to a system and method of acquiring contents. More particularly, the description relates to a system and method of acquiring contents in which, where a user of a client terminal photographs or records partial information of contents using the client terminal and the partial information of contents, provided via an output unit connected to a local server, is transmitted to the local server, the local server transmits contents or content-related information corresponding to the partial information of contents to the client terminal.

BACKGROUND

Currently, many people enjoy a variety of contents using small portable terminals anytime and anywhere due to the development of digital technologies. Various peripheral devices for personal computing such as a personal computer (PC), keyboard, mouse, printer, and the like, are being used, and new devices will be developed.

In such a computing environment, the use of multimedia contents increases. A number of people enjoy video and music in the computing environment as well as mobile environment. Particularly, a desire to share contents with other people via mobile devices increases, in addition to individually enjoying multimedia contents. Accordingly, a variety of user created contents (UCC) websites are made, and sharing contents using a peer to peer (P2P) program becomes common.

However, it is not simple to transmit and store multimedia contents in a mobile environment. Particularly, when a user desires to acquire a song heard on the street, the user may acquire the song only when the user knows exact information about the song by searching for the song on the Internet, and the like.

Accordingly, a technology which may enable a user to conveniently and instantly acquire various types of multimedia contents and information associated with the contents anytime and anywhere in a mobile environment is needed.

SUMMARY

In one general aspect, there is provided a system and method of acquiring contents in which a client terminal photographs or records partial information of contents, and transmits the partial information of contents to a local server according to an input of a user, and the local server retrieves contents corresponding to the partial information of contents and transmits the contents to the client terminal.

In another general aspect, a method of acquiring contents between a client terminal and a local server includes: the client terminal photographing or recording partial information of predetermined contents according to an input of a user; the client terminal transmitting the partial information of contents to a predetermined local server; the local server analyzing the partial information of contents, and retrieving contents or content-related information corresponding to the partial information of contents; and the local server transmitting the retrieved contents or content-related information to the client terminal.

In still another general aspect, a method of acquiring contents between a client terminal and a local server includes: the client terminal photographing or recording partial information of predetermined contents according to an input of a user; the client terminal broadcasting the partial information of contents to at least one local server; each of the at least one local server analyzing the partial information of contents, and determining whether contents or content-related information corresponding to the partial information of contents exists; and transmitting, by each of the at least one local server which stores the contents or content-related information corresponding to the partial information of contents, the contents or content-related information to the client terminal according to a result of the analyzing.

In yet another general aspect, a system for acquiring contents includes: a client terminal which photographs or records partial information of predetermined contents according to an input of a user, and transmits the partial information of contents to a predetermined local server; and a local server which analyzes the partial information of contents received from the client terminal, retrieves contents or content-related information corresponding to the partial information of contents, and transmits the retrieved contents or content-related information to the client terminal.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
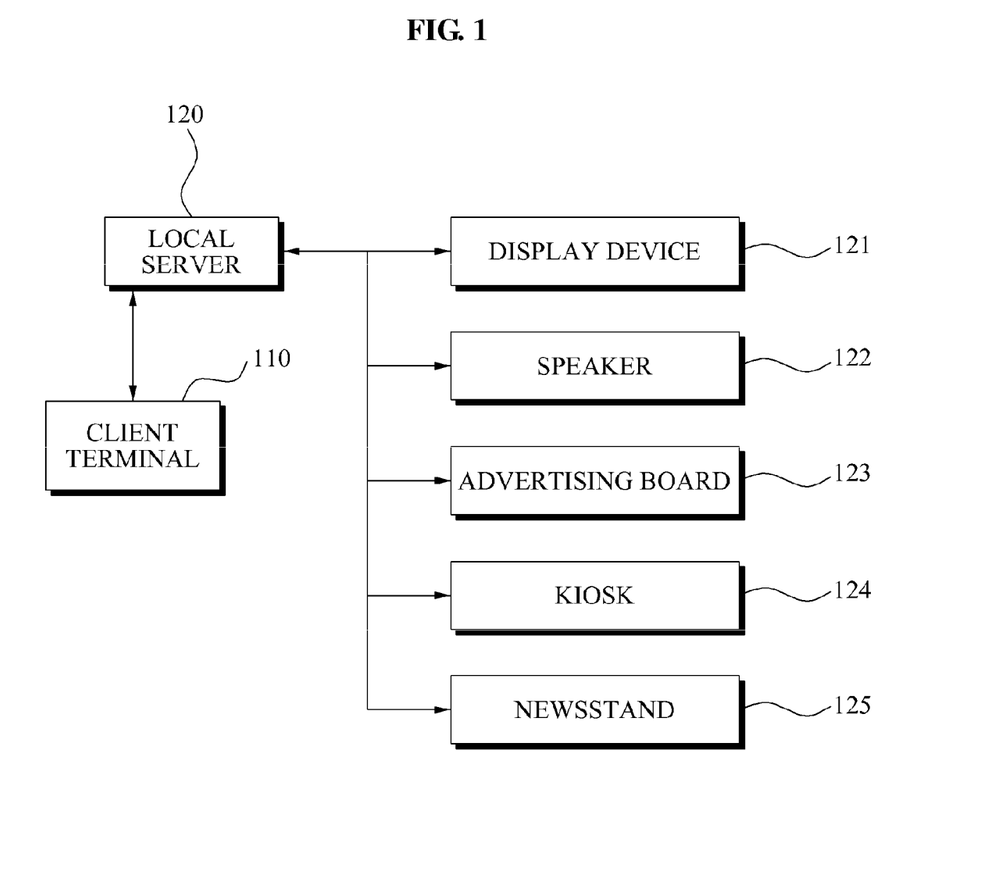
FIG. 1 is a diagram illustrating a network between a client terminal and a local server according to an exemplary embodiment.

FIG. 1 illustrates a network between a client terminal 110 and a local server 120 according to an exemplary embodiment.

A system for acquiring contents according to an exemplary embodiment includes the client terminal 110 and the local server 120. The client terminal 110 may be embodied as a personal portable terminal including a local communication module. For example, the client terminal 110 may be embodied as a mobile communication terminal, personal digital assistant (PDA), portable media player (PMP), notebook, ultra-mobile personal computer (UMPC), portable game player, and the like.

Also, the local communication module may be embodied to include various types of local communication schemes used for a local communication in the related art, such as Bluetooth, Zigbee, and Ultra Wideband (UWB).

The local server 120 is connected or linked to at least one output device 121, 122, 123, 124, and 125. The local server 120 provides a user with contents via the at least one output device 121, 122, 123, 124, and 125. For example, the local server 120 may display or replay a video or image via a display device 121. Also, the local server 120 may replay music or voice via a speaker 122. Also, the local server 120 may display or replay various types of advertising contents via an advertising board 123. Also, the local server 120 may display or replay information such as information about departure and arrival, train departure time, bus lines, and the like, via a kiosk 124.

As described above, the local server 120 may provide the user with a variety of multimedia contents via the display device 121, speaker 122, advertising board 123, or kiosk 124.

Also, the local server 120 may be linked to a newsstand 125. For example, when a magazine is on the newsstand 125, the local server 120 may maintain various information about the magazine in a form of multimedia contents.

The local server 120 includes the local communication module utilizing at least one local communication scheme such as Bluetooth, Zigbee, and UWB, similar to the client terminal 110. Also, the local server 120 may include an Internet access module or mobile communication module which may be connected to an external server via the Internet or mobile communication network.

Figure 2:
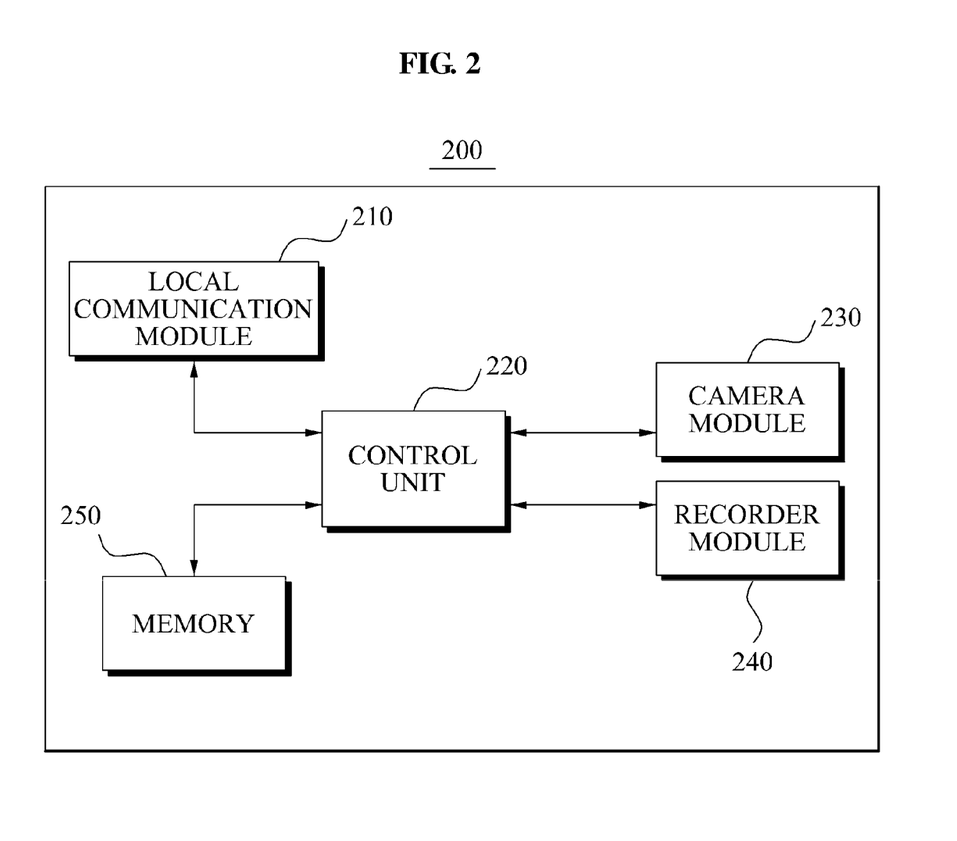
FIG. 2 is a block diagram illustrating a configuration of an exemplary client terminal.

FIG. 2 illustrates a configuration of an exemplary client terminal 200.

The client terminal 200 includes a local communication module 210, a control unit 220, a camera module 230, a recorder module 240, and a memory 250.

The local communication module 210 transceives data via a local area network (LAN) to/from a local server located nearby. The local communication module 210 may be embodied in any one of a Bluetooth, Zigbee, and UWB scheme. Also, the local communication module 210 may be embodied to include various types of local communication modules used for local communication in the related art.

The control unit 220 controls a function and performance of the client terminal 200. The camera module 230 photographs a video or image according to an input of a user. The camera module 230 may be embodied to support a photographing and video-recording function.

The recorder module 240 records music or voice according to the input of the user.

The memory 250 stores partial information of the contents recorded or photographed according to the input of the user.

The client terminal 200 photographs partial information of predetermined contents according to the input of the user via the camera module 230, or records the partial information of the predetermined contents according to the input of the user via the recorder module 240.

For example, when the user desires to acquire a music video being replayed in a liquid crystal display (LCD) monitor, the user records a portion of the music video using the camera module 230. Accordingly, the control unit 220 may store the portion of the music video, that is, partial information of contents, in the memory 250, or transmit the portion of the music video to the local server, located nearby, via the local communication module 210 according to an input of the user.

Also, when the user photographs a portion of information about departure and arrival being displayed in a kiosk located in an airport, the control unit 220 may store the portion of the information about departure and arrival, that is, partial information of contents, in the memory 250, or transmit the portion of the information about departure and arrival to the local server via the local communication module 210 according to an input of the user.

Also, when the user photographs an advertising board to acquire information about a product displayed in the advertising board, the control unit 220 may store the taken picture of the advertising board, that is, partial information of contents, in the memory 250, or transmit the taken picture of the advertising board to the local server via the local communication module 210 according to an input of the user.

Also, when the user records a portion of music or voice being replayed in a speaker, the control unit 220 may store the portion of music or voice, that is, partial information of contents, in the memory 250, or transmit the portion of the portion of music or voice to the local server via the local communication module 210 according to an input of the user.

Also, when the user photographs a drawing exhibited in a gallery, the control unit 220 may store the drawing, that is, partial information of contents, in the memory 250, or transmit the drawing to the local server via the local communication module 210 according to an input of the user.

Also, when the user photographs a portion of a tour map in a travel information center, the control unit 220 may store the portion of the tour map, that is, partial information of contents, in the memory 250, or transmit the portion of the tour map to the local server via the local communication module 210 according to an input of the user.

Also, when the user photographs a portion of a magazine in a newsstand, the control unit 220 may store the portion of the magazine, that is, partial information of contents, in the memory 250, or transmit the portion of the magazine to the local server via the local communication module 210 according to an input of the user.

Figure 3:
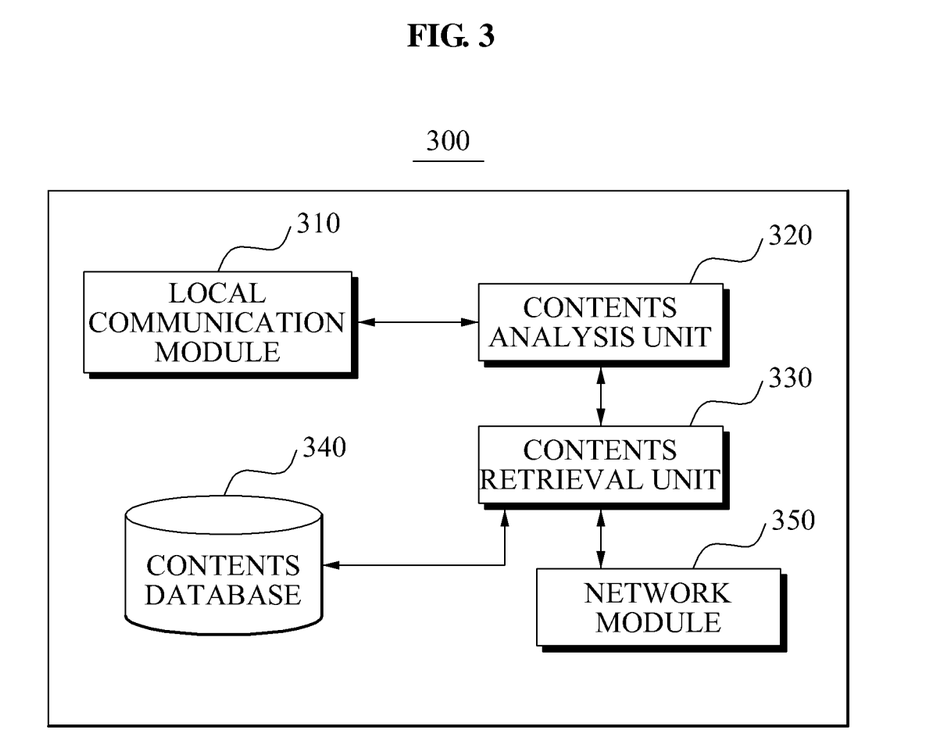
FIG. 3 is a block diagram illustrating a configuration of an exemplary local server.

FIG. 3 illustrates a configuration of an exemplary local server 300.

The local server 300 includes a local communication module 310, a contents analysis unit 320, a contents retrieval unit 330, a contents database 340, and a network module 350.

The local communication module 310 transceives data to/from a client terminal located nearby via a LAN. The local communication module 310 may be embodied in any one of a Bluetooth, Zigbee, and UWB scheme. Also, the local communication module 310 may be embodied to include various types of local communication modules used for a local communication in the related art.

The contents analysis unit 320 analyzes partial information of contents received from the client terminal. The contents analysis unit 320 may analyze the partial information of contents using Moving Picture Experts Group 7 (MPEG 7).

MPEG 7 is a technology to retrieve contents using a scene of a movie, a portion of music or sound effect, and the like, without using textual information which is currently used on the Web. Accordingly, MPEG 7 is a standard of content description for information searches, unlike standards which deals with encoding like MPEG 1, MPEG 2, and MPEG 4.

Although conventional MPEG 1, MPEG 2, and MPEG 4 aim at data compression of audio, audio and video information, MPEG 7 deals with a description method with respect to data content, not data itself. Accordingly, in MPEG 7, which is content-based multimedia search technology, multimedia data is automatically divided into a video segment based on contents, and contents of the divided segment is set as a single representative frame. When setting the representative frame, features such as a color, texture, shape, and sound are automatically extracted, and retrieval is performed based on the features.

MPEG 7 includes a system part, description definition language (DDL), audio part, video part, multimedia description scheme (MDS), related software part, and test part.

The system part provides a tool capable of manufacturing a description of contents for efficient storage and transmission, and a tool for protection and management of intellectual property rights.

The DDL is related to a development of a basic language used for a description scheme and a descriptor of contents.

The audio part defines a descriptor and a description scheme of an audio, and the video part defines a descriptor and a description scheme of a video.

The MDS defines a general feature and a description structure of multimedia. The related software part is related to a development of software associated with MPEG 7. The test part is related to a test of suggested algorithms.

When using MPEG 7 described above, editing of multimedia information, sorting of video and musical dictionary in a digital library, multimedia directory service, broadcast media selection such as radio, television (TV), and the like, biomedical information management, shopping information selection, geographical information service, and the like may be embodied. Particularly, a usage of multimedia information may significantly increase in a mobile device. That is, when a user of a mobile communication terminal or a PDA desires to acquire contents, data may be automatically retrieved, converted to a required size, and provided using MPEG 7.

As described above, the contents analysis unit 320 may analyze characteristics of the partial information of contents using MPEG 7. In addition to MPEG 7, a variety of contents analysis technologies, which analyze the characteristics of the partial information of contents in order to interpret which contents corresponds to the partial information of contents, may be applied. The partial information of contents may be embodied as multimedia contents such as a video, image, music, voice, and the like, as described above.

The contents retrieval unit 330 retrieves contents or content-related information corresponding to the partial information of contents using the characteristics of the partial information of contents. The contents retrieval unit 330 may retrieve the contents or content-related information from the contents database 340. Also, the contents retrieval unit 330 may retrieve the contents or content-related information from an external server connected to a wired/wireless Internet network or mobile communication network via the network module 350.

The contents database 340 maintains at least one content or content-related information. A type of contents maintained by the contents database 340 may be varied according to a determination of a designer skilled in the related art. For example, the contents may be embodied as a video, music, image, or contents including various information such as advertising information, digital map, flight information about departure and arrival, bus or subway line information, e-book, sales information, and the like, according to the determination of a designer skilled in the related art.

Also, the content-related information may be embodied as related information corresponding to each of the contents. For example, when the contents is an "MP3" file, the content-related information corresponding to the contents, the content-related information may be embodied as file name information of "Lena Park—I'll send a letter", running time information of "4 minutes 30 seconds", album information of "Lena Park $2^{nd}$ album", download price information of "1,000 won", and the like.

The contents retrieval unit 330 transmits the contents or content-related information corresponding to the partial information of contents to the client terminal via the local communication module 310 or the network module 350.

Accordingly, the user of the client terminal may acquire desired contents or content-related information by simply photographing or recording partial information of contents, provided by various types of media in real time, and transmitting the partial information of contents to the local server 300. Specifically, when the user has no information about contents provided by a particular medium in a particular place, the user may acquire the contents itself and information related to the contents by photographing or recording the contents using a client terminal of the user.

Figure 4:
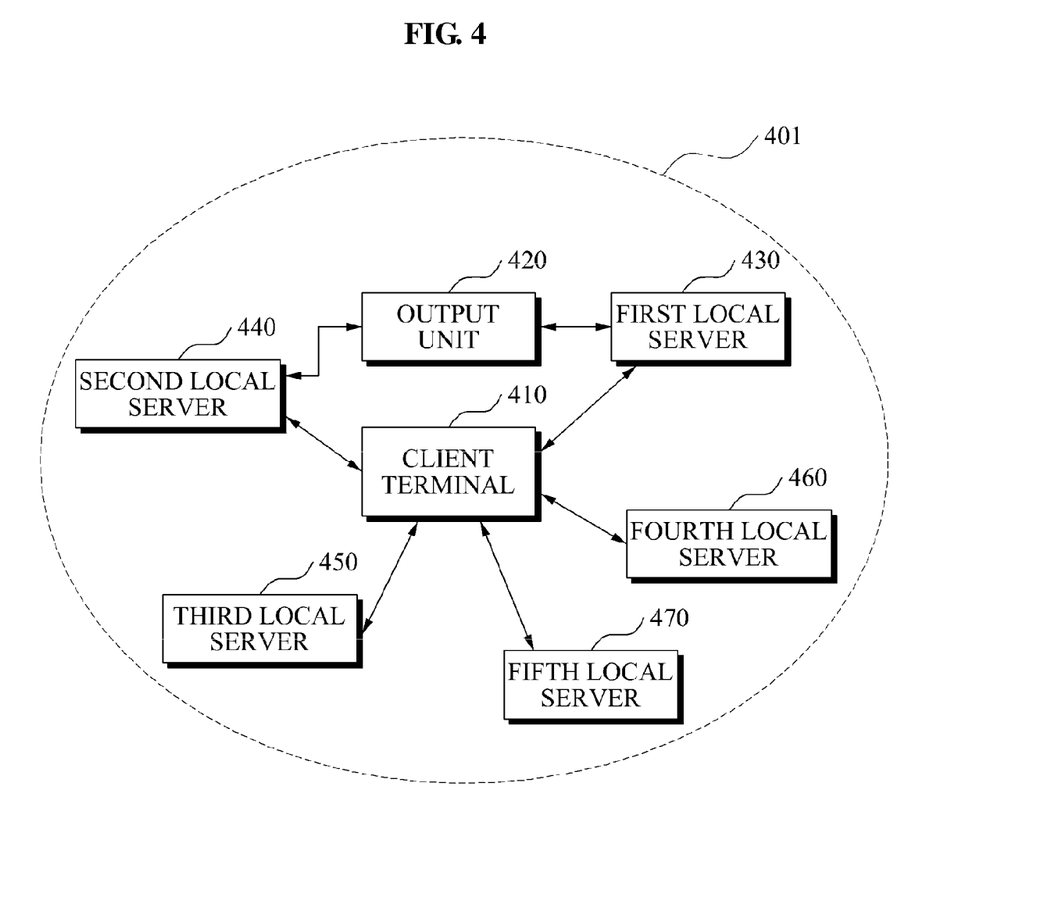
FIG. 4 is a diagram illustrating a network between a client terminal and a local server according to another exemplary embodiment.

FIG. 4 illustrates a network between a client terminal 410 and a local server according to another exemplary embodiment.

A system for acquiring contents according to an exemplary embodiment includes the client terminal 410 and at least one local server 430, 440, 450, 460, and 470.

A user of the client terminal 410 watches or enjoys contents via an output unit 420. The output unit 420 may be network-connected to a first local server 430 and a second local server 440. In this instance, it is illustrated that the contents being replayed or displayed via the output unit 420 is outputted from the first local server 430, as an example.

When the user of the client terminal 410 desires to acquire the contents, the user photographs or records partial information of the contents being replayed or displayed.

The client terminal 410 broadcasts the partial information of the contents to the at least one local server 430, 440, 450, 460, and 470, located in a local area network range 401, via a local communication module. Specifically, according to an exemplary embodiment, when the user of the client terminal 410 does not know which local server is providing the contents after photographing or recording the partial information of the contents, the client terminal 410 may broadcast the partial information of the contents to all the local server 430, 440, 450, 460, and 470 located in the local area network range 401.

The first local server 430, second local server 440, third local server 450, fourth local server 460, and fifth local server 470, which receive the partial information of the contents, analyze the partial information of the contents, and determine whether contents or content-related information corresponding to the partial information of the contents are stored in a contents database based on the analysis result. In this case, since the contents are provided from the first local server 430, the first local server 430 transmits the contents or content-related information corresponding to the partial information of the contents to the client terminal 410.

According to an exemplary embodiment, even when the user of the client terminal 410 does not know which local server provides contents being provided via the output unit 420, the user may acquire desired contents or content-related information by simply photographing or recording the partial information of the contents and broadcasting the partial information of the contents to a plurality of local servers.

Figure 5:
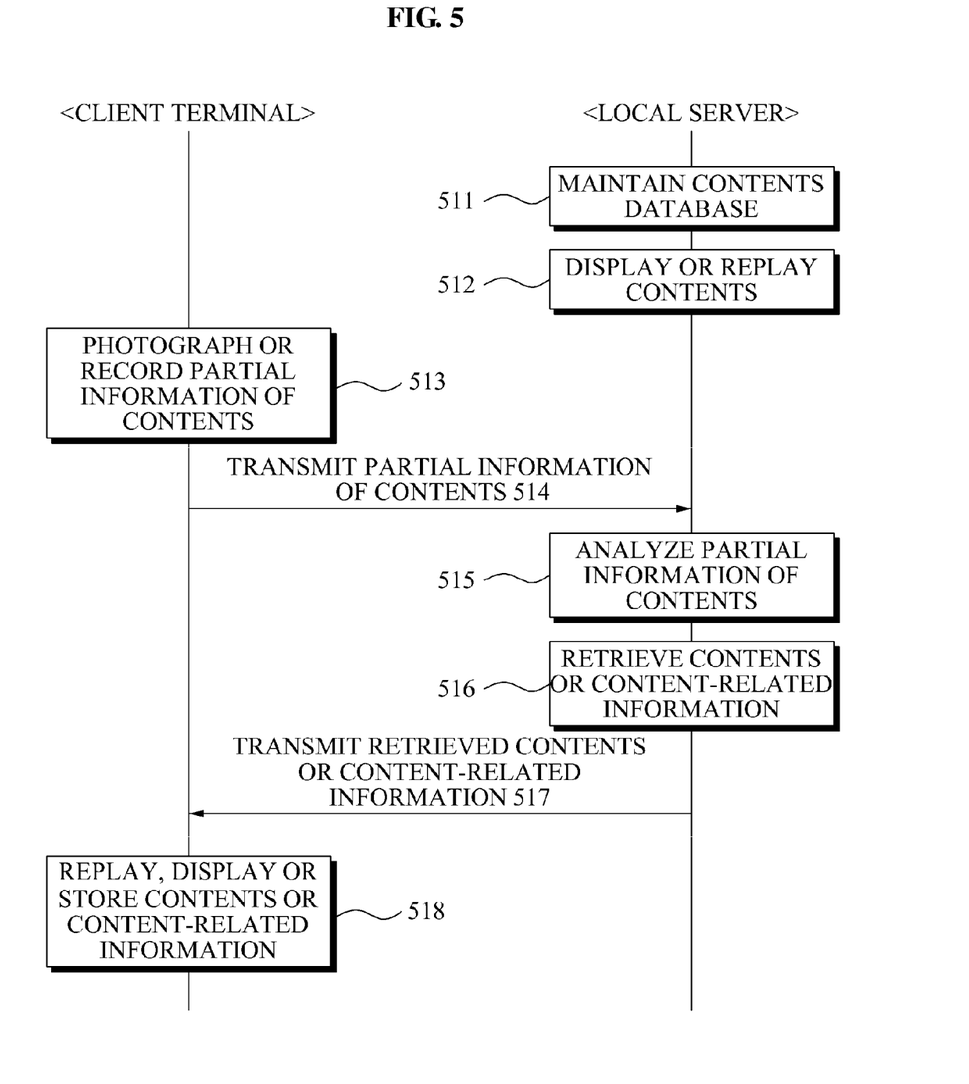
FIG. 5 is a flowchart illustrating an exemplary method of acquiring contents.

FIG. 5 illustrates an exemplary method of acquiring contents.

A system for acquiring contents according to an exemplary embodiment includes a client terminal and a local server.

In operation 511, the local server maintains a contents database storing at least one multimedia content. In operation 512, the local server displays or replays predetermined contents via an output unit.

In operation 513, the client terminal photographs or records partial information of the contents being displayed or replayed via the output unit according to an input of a user.

In operation 514, the client terminal transmits the partial information of the contents to the local server via a LAN.

In operation 515, the local server analyzes the partial information of the contents. In operation 516, the local server retrieves contents or content-related information corresponding to the analyzed partial information of the contents from the contents database. Also, the local server may retrieve the contents or content-related information corresponding to the analyzed partial information of the contents from an external server.

In operation 517, the local server transmits the retrieved contents or content-related information to the client terminal via the LAN.

In operation 518, the client terminal replays, displays, or stores the contents or content-related information, received from the local server, according to a selection of the user.

Figure 6:
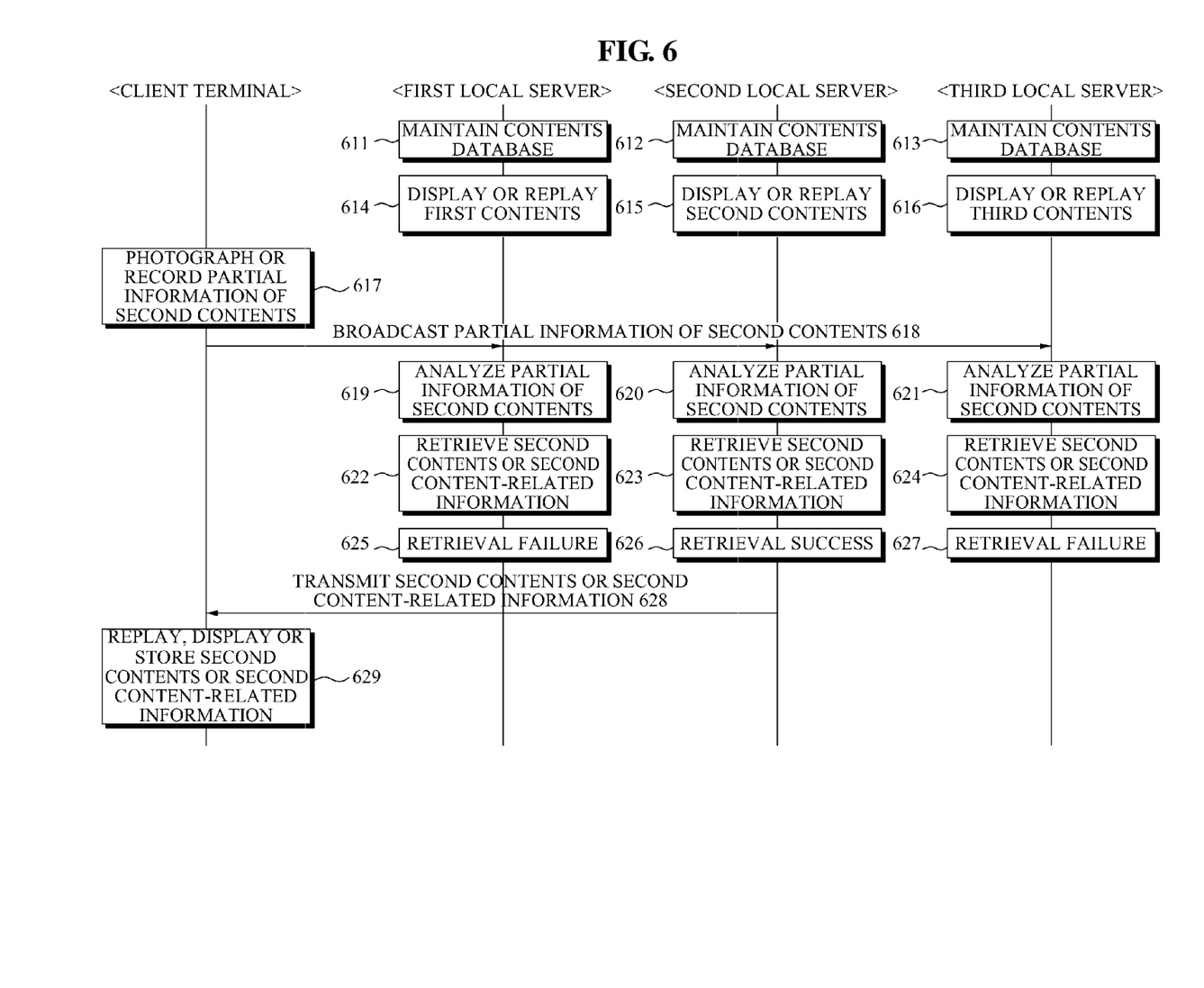
FIG. 6 is a flowchart illustrating another exemplary method of acquiring contents.

FIG. 6 illustrates another exemplary method of acquiring contents.

A system for acquiring contents according to the other exemplary embodiment includes a client terminal and at least one local server. In FIG. 6, it is illustrated that the at least one local server includes a first local server, second local server, and third local server, as an example.

In operation 611, the first local server maintains a first contents database storing at least one multimedia content. In operation 612, the second local server maintains a second contents database storing at least one multimedia content. In operation 613, the third local server maintains a third contents database storing at least one multimedia content.

In operation 614, the first local server displays or replays first contents via an output unit. In operation 615, the second local server displays or replays second contents via an output unit. In operation 616, the third local server displays or replays third contents via an output unit.

In operation 617, the client terminal photographs or records partial information of the second contents from among the first contents, second contents, and third contents, according to an input of a user. In operation 618, the client terminal broadcasts the partial information of the second contents to all local servers located in a local area network range, that is, the first local server, the second local server, and the third local server in the current example embodiment.

In operation 619, the first local server analyzes the partial information of the second contents received from the client terminal. In operation 620, the second local server analyzes the partial information of the second contents received from the client terminal. In operation 621, the third local server analyzes the partial information of the second contents received from the client terminal.

In operation 622, the first local server retrieves second contents or second content-related information corresponding to an analysis result of the partial information of the second contents from the first contents database. In operation 623, the second local server retrieves second contents or second content-related information corresponding to an analysis result of the partial information of the second contents from the second contents database. In operation 624, the third local server retrieves second contents or second content-related information corresponding to an analysis result of the partial information of the second contents from the third contents database.

In operation 625, the first local server fails to retrieve the second contents or second content-related information from the first contents database. In operation 626, the second local server succeeds in retrieving the second contents or second content-related information from the second contents database. In operation 627, the third local server fails to retrieve the second contents or second content-related information from the third contents database.

In operation 628, the second local server, which succeeds in retrieving the second contents or second content-related information, transmits the second contents or second content-related information to the client terminal via the LAN.

In operation 629, the client terminal replays, displays, or stores the second contents or second content-related information, received from the second local server, according to a selection of the user.

Although methods of acquiring contents have been simply described with reference to FIGS. 5 and 6, it will be apparent to those skilled in the related art that methods may be embodied to include a method of acquiring contents of a system for acquiring contents described with reference to FIGS. 1 through 3.

The methods described above including methods of acquiring contents may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

According to aspects described above, there is provided a system and method of acquiring contents in which a client terminal photographs or records partial information of contents, and transmits the partial information of contents to a local server according to an input of a user, and the local server retrieves contents corresponding to the partial information of contents and transmits the contents to the client terminal. Accordingly, and the user may acquire currently-provided contents or content-related information instantly and conveniently, even though the user may not know exact information about the contents.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of acquiring contents between a client terminal and two or more local servers, the client terminal comprising a camera and/or a recorder, the method comprising:

photographing and/or recording partial information of the contents displayed or replayed by at least one of the two or more local servers via an output unit according to an input of a user instructing the photographing and/or the recording, using the camera and/or the recorder of the client terminal;

determining whether the client terminal knows a local server that is providing the contents among the local servers;

transmitting the partial information of the contents to the local server via a local area network (LAN) in response to the client terminal knowing the local server that is providing the contents;

broadcasting the partial information of the contents to the local servers via the LAN in response to the client terminal not knowing which of the local servers is providing the contents, the local server or the local servers analyzing the partial information of the contents, using Moving Pictures Experts Group 7 (MPEG 7), and the local server or the local servers retrieving, from respective databases, the contents and/or content-related information that correspond to a result of the analyzing of a scene of a movie and/or a portion of music or a sound effect; and receiving the retrieved contents and/or content-related information from the local server or at least one of the local servers via the LAN, wherein the photographing, or the recording, or the transmitting, or the receiving, or any combination thereof is performed by a processor.

2. The method of claim 1, wherein the LAN uses a Bluetooth scheme, or a Zigbee scheme, or an ultra wideband (UWB) scheme, or any combination thereof.

3. The method of claim 1, wherein the local server maintains the respective database that stores the contents and/or the content-related information.

4. The method of claim 3, wherein the local server maintains a network connection with an external server, and retrieves, from the respective database or the external server, the contents and/or the content-related information that corresponds to the result of the analyzing of the partial information of the contents.

5. A method of acquiring contents between a client terminal and two or more local servers, the client terminal comprising a camera and/or a recorder, the method comprising:

photographing and/or recording partial information of the contents displayed or replayed by at least one of the two or more local servers via an output unit according to an input of a user instructing the photographing or the recording, using the camera and/or the recorder of the client terminal;

determining whether the client terminal knows a local server that is providing the contents among the local servers;

transmitting the partial information of the contents to the local server via a local area network (LAN) in response to the client terminal knowing the local server that is providing the contents;

broadcasting the partial information of the contents to the local servers via the LAN in response to the client terminal not knowing which of the local servers is providing the contents, the local server or the local servers analyzing the partial information of the contents, using Moving Pictures Experts Group 7 (MPEG 7), and the local server or the local servers determining whether the contents and/or content-related information that correspond to a result of the analyzing of a scene of a movie and/or a portion of music or a sound effect exist in respective databases; and receiving the contents and/or the content-related information from the local server or at least one of the local servers that comprises the respective database in which the contents and/or the content-related information that correspond to the result of the analyzing of the partial information of the contents are determined to exist, via the LAN, wherein the photographing, or the recording, or the broadcasting, or the receiving, or any combination thereof is performed by a processor.

6. The method of claim 5, wherein the LAN uses a Bluetooth scheme, or a Zigbee scheme, or an ultra wideband (UWB) scheme, or any combination thereof.

7. The method of claim 5, wherein the local servers maintain the respective databases that store the contents and/or the content-related information.

8. A non-transitory computer-readable storage medium storing a program comprising instructions to cause a computer to perform a method of acquiring contents between a client terminal and two or more local servers, the client terminal comprising a camera and/or a recorder, the method comprising:

photographing and/or recording partial information of the contents displayed or replayed by at least one of the two or more local servers via an output unit according to an input of a user instructing the photographing and/or the recording, using the camera and/or the recorder of the client terminal;

determining whether the client terminal knows a local server that is providing the contents among the local servers;

transmitting the partial information of the contents to the local server via a local area network (LAN) in response to the client terminal knowing the local server that is providing the contents;

broadcasting the partial information of the contents to the local servers via the LAN in response to the client terminal not knowing which of the local servers is providing the contents, the local server or the local servers analyzing the partial information of the contents, using Moving Pictures Experts Group 7 (MPEG 7), and the local server or the local servers retrieving, from respective databases, the contents and/or content-related information that correspond to a result of the analyzing of a scene of a movie and/or a portion of music or a sound effect; and receiving the retrieved contents and/or content-related information from the local server or at least one of the local servers via the LAN.

9. A method of transmitting contents between a client terminal and a local server among two or more local servers, the client terminal comprising a camera and/or a recorder, the method comprising:

receiving partial information of the contents from the client terminal via a local area network (LAN), the client terminal photographing and/or recording the partial information of the contents displayed or replayed by at least one of the two or more local servers via an output unit according to an input of a user instructing the photographing and/or the recording, using the camera and/or the recorder of the client terminal, the client terminal determining whether the client terminal knows the local server that is providing the contents, the client terminal transmitting the partial information of the contents to the local server via the LAN in response to the client terminal knowing the local server that is providing the contents, and the client terminal broadcasting the partial information of the contents to the local servers via the LAN in response to the client terminal not knowing which of the local servers is providing the contents;

analyzing the partial information of the contents that is received from the client terminal, using Moving Pictures Experts Group 7 (MPEG 7);

retrieving, from a database of the local server, the contents and/or content-related information that correspond to a result of the analyzing of a scene of a movie and/or a portion of music or a sound effect; and transmitting the retrieved contents and/or content-related information to the client terminal via the LAN, wherein the receiving, or the analyzing, or the retrieving, or the transmitting, or any combination thereof is performed by a processor.

10. The method of claim 9, wherein the LAN uses a Bluetooth scheme, or a Zigbee scheme, or an ultra wideband (UWB) scheme, or any combination thereof.

11. The method of claim 9, further comprising:
maintaining the database that stores the contents and/or the content-related information.

12. The method of claim 11, further comprising:
maintaining a network connection with an external server; and
retrieving, from the database or the external server, the contents and/or the content-related information that corresponds to the result of the analyzing of the partial information of the contents.

13. A client terminal, comprising:
a camera module configured to photograph partial information of contents displayed or replayed by at least one of two or more local servers via an output unit according to an input of a user instructing the photographing;
a recorder module configured to record partial information of the contents according to an input of the user instructing the recording; and
a local communication module configured to determine whether the client terminal knows a local server that is providing the contents among the local servers, transmit the partial information of the contents to the local server via a local area network (LAN) in response to the client terminal knowing the local server that is providing the contents,
broadcast the partial information of the contents to the local servers via the LAN in response to the client terminal not knowing which of the local servers is providing the contents, and
receive the contents and/or content-related information from the local server or at least one of the local servers via the LAN,
wherein the local servers are configured to analyze the partial information of the contents, using Moving Pictures Experts Group 7 (MPEG 7), and retrieve, from respective databases, the contents and/or the content-related information that correspond to a result of the analyzing of a scene of a movie and/or a portion of music or a sound effect.

14. A local server among two or more local servers, the local server comprising:
a local communication module configured to receive partial information of contents from a client terminal via a local area network (LAN), the client terminal photographing and/or recording the partial information of the contents displayed or replayed by at least one of the two or more local servers via an output unit according to an input of a user instructing the photographing and/or the recording, the client terminal determining whether the client terminal knows the local server that is providing the contents, the client terminal transmitting the partial information of the contents to the local server via the LAN in response to the client terminal knowing the local server that is providing the contents, and the client terminal broadcasting the partial information of the contents to the local servers via the LAN in response to the client terminal not knowing which of the local servers is providing the contents;
a contents analysis unit configured to analyze the partial information of the contents that is received from the client terminal, using Moving Pictures Experts Group 7 (MPEG 7); and
a contents retrieval unit configured to retrieve, from a database of the local server, the contents and/or content-related information that correspond to a result of the analyzing of a scene of a movie and/or a portion of music or a sound effect,
wherein the local communication module is further configured to transmit the retrieved contents and/or content-related information to the client terminal via the LAN.

* * * * *